(12) United States Patent
Sagar

(10) Patent No.: US 7,175,901 B1
(45) Date of Patent: Feb. 13, 2007

(54) RETROREFLECTIVE INKS

(75) Inventor: Brian Sagar, Cheadle (GB)

(73) Assignee: Reflec plc, Winsford (GB)

( * ) Notice: Subject to any disclaimer, the term of this patent is extended or adjusted under 35 U.S.C. 154(b) by 0 days.

(21) Appl. No.: 09/889,282

(22) PCT Filed: Jan. 12, 2000

(86) PCT No.: PCT/GB00/00062

§ 371 (c)(1),
(2), (4) Date: Sep. 21, 2001

(87) PCT Pub. No.: WO00/42113

PCT Pub. Date: Jul. 20, 2000

(30) Foreign Application Priority Data

| Jan. 14, 1999 | (GB) | ................... | 9900654.6 |
| Jan. 19, 1999 | (GB) | ................... | 9901031.6 |
| Sep. 10, 1999 | (GB) | ................... | 9921394.4 |
| Sep. 14, 1999 | (GB) | ................... | 9921618.6 |

(51) Int. Cl.
*B32B 5/16* (2006.01)

(52) U.S. Cl. .............. 428/195.1; 428/313.3; 428/313.5; 428/313.7; 428/313.9; 106/31.13; 106/31.6; 106/31.85; 427/487; 427/508

(58) Field of Classification Search ............ 428/195.1, 428/313.3–313.9, 31.13–31.92; 106/31.13, 106/31.6, 31.85
See application file for complete search history.

(56) References Cited

U.S. PATENT DOCUMENTS

| 3,251,704 A | 5/1966 | Nellessen |
| 3,535,019 A | 10/1970 | Longlet et al. |
| 3,758,192 A | 9/1973 | Bingham |
| 3,835,087 A | 9/1974 | Searight et al |
| 4,102,562 A | 7/1978 | Harper et al. |
| 4,103,060 A | 7/1978 | Bingham et al. |
| 4,104,102 A | 8/1978 | Eagon et al. |
| 4,263,345 A | 4/1981 | Bingham |
| 4,265,937 A | 5/1981 | Kameya et al. |
| 4,367,920 A | 1/1983 | Tung et al. |
| 4,471,386 A | 9/1984 | Tuhro |
| 4,605,461 A | 8/1986 | Ogi |

(Continued)

FOREIGN PATENT DOCUMENTS

EP 0045979 8/1981

(Continued)

OTHER PUBLICATIONS

Special Effects Projections Screens—*3M Product Bulletin—Industrial Optics.*

(Continued)

*Primary Examiner*—Elizabeth M. Cole
(74) *Attorney, Agent, or Firm*—Bracewell & Giuliani LLP (57) ABSTRACT

The combination of ingredients, especially for use in the formulation of a one or two-pack retroreflective ink, comprising retroreflective elements, microbeads additional to said retroreflective elements and/or constituting said retroreflective elements at least in part, binder chemicals for attaching the retroreflective elements and microbeads to a substrate to which the ink is to be applied, and a coupling agent for coupling the microbeads and cross-linking the binder chemicals, the coupling agent being unreactive until the printing process is carried out.

57 Claims, 1 Drawing Sheet

U.S. PATENT DOCUMENTS

| | | | |
|---|---|---|---|
| 4,796,990 A | | 1/1989 | Crothers et al. |
| 4,985,484 A | * | 1/1991 | Yoshida et al. ............. 524/379 |
| 5,117,283 A | | 5/1992 | Kroos et al. |
| 5,128,804 A | | 7/1992 | Lightle et al. |
| 5,200,262 A | | 4/1993 | Li |
| 5,269,840 A | | 12/1993 | Morris et al. |
| 5,358,750 A | | 10/1994 | Brookfield |
| 5,650,213 A | | 7/1997 | Rizika et al. |

FOREIGN PATENT DOCUMENTS

| | | | |
|---|---|---|---|
| EP | 0326186 | | 4/1984 |
| EP | 0227448 | | 12/1986 |
| EP | 0305074 | | 8/1988 |
| EP | 0389114 | | 2/1990 |
| EP | 0408889 A1 | | 6/1990 |
| EP | 0672920 A1 | | 10/1992 |
| EP | 0693697 A2 | | 7/1995 |
| EP | 0840143 A1 | | 5/1997 |
| EP | 0876055 A2 | | 11/1998 |
| GB | 940424 | | 2/1959 |
| GB | 1175692 | | 11/1966 |
| GB | 1235327 | | 7/1968 |
| GB | 1424754 | | 1/1973 |
| GB | 1447585 | | 3/1974 |
| GB | 1451170 | | 4/1974 |
| GB | 1547043 | | 2/1976 |
| GB | 2162628 A | | 5/1985 |
| GB | 2165773 A | | 10/1985 |
| GB | 2214915 A | | 9/1988 |
| GB | 2241179 A | | 2/1991 |
| GB | 2321814 A | | 1/1997 |
| GB | 2316021 A | | 8/1997 |
| GB | 2321565 A | | 1/1998 |
| JP | 02043275 A | * | 2/1990 |
| JP | 02300253 A | * | 12/1990 |
| JP | 03259969 A | * | 11/1991 |
| WO | WO 94/06869 | | 9/1993 |
| WO | WO 95/14248 | | 11/1994 |
| WO | WO 96/17264 | | 11/1995 |
| WO | WO 96/29620 | | 2/1996 |
| WO | WO 96/10522 | | 8/1996 |
| WO | WO 97/12284 | | 9/1996 |
| WO | WO 98/45735 | | 7/1997 |
| WO | WO 98/28642 | | 12/1997 |
| WO | WO 01/20900 A2 | | 3/2001 |

OTHER PUBLICATIONS

Blue-Max High-Power Blue Flux Projector for Large Scale Bluescreen Composite Photography, pp. 1156-1165—*SMPTE Journal*, Nov. 1985.

* cited by examiner

RETROREFLECTIVE INKS

This application is a 371 of PCT/GB00/00062 filed Jan. 12, 2000.

This invention relates to retroreflective inks and methods for making them.

Retroreflective coating compositions have been the subject of numerous patents, for example U.S. Pat. No. 2,963,378, Palmquist et al, U.S. Pat. Nos. 3,099,637, 3,228,897 and U.S. Pat. No. 3,420,597, Nellessen, U.S. Pat. No. 3,535,019, Longlet et al and U.S. Pat. No. 4,103,060 and 4,263,345, Bingham et al. A retroreflective ink has been commercially available for a number of years, marketed by the 3M company, this product being available in dark grey and sold as a three pack system, comprising a binder dispersion system, a pack of hemispherically coated glass microspheres or beads and a coupling agent, which are mixed just prior to use.

One pack inks were proposed in WO 94/06869, M N Ellis and in EP 0 729 592, Reflective Technology Industries Limited and U.S. Pat. No. 5,650,213, Reflective Technology Inc., which also disclose the incorporation of pigment. U.S. Pat. No. 5,650,213 specified a range of pigment particle size which is what is, in fact, the usual range commercially available, and ranges of binder/bead and binder/(bead and pigment) volume ratios which are seemingly the ranges of choice to produce an ink which is printable by conventional screen printing techniques.

Problems associated with the performance of reflective coatings, especially in the convenient, one-pack form that does not require mixing just prior to printing, involve shelf life, washfastness and abrasion resistance. These key areas are interrelated the binder system must be such as will not allow the beads to settle even over extended storage periods, and it must also not couple to the beads during that storage, yet it must, on printing, adhere the beads to the substrate in a reasonably washfast and abrasion resistant manner while permitting the beads to be exposed appropriately to retroreflect light.

The severity of these problems may explain the sale by 3M of the three pack system and the fact that the inks produced according to U.S. Pat. No. 5,650,213 are formulated solely for the production of printed fabric by the patentee Reflective Technology Inc. and not for sale to printers.

The present invention addresses these—and other—problems and provides long shelf life one pack retroreflective ink systems with good washfastness and abrasion resistance.

According to one aspect of the present invention there is provided the combination of ingredients, especially for use in the formulation of a one or two-pack retroreflective ink, comprising retroreflective elements, microbeads additional to said retroreflective elements and/or constituting said retroreflective elements at least in part, binder chemicals for attaching the retroreflective elements and microbeads to a substrate to which the ink is to be applied, and a coupling agent for coupling the microbeads and cross-linking the binder chemicals, the coupling agent being unreactive until the printing process is carried out.

A one-pack ink produced using the above combination of ingredients may have a storage life of not less than 3 months, preferably not less than 6 months and more preferably not less than 12 months when stored under ambient conditions (i.e. a temperature of about 20° C.). Also such inks, when stored for prolonged periods of 3 months or more under ambient conditions, show no significant change in rheology while retaining adequate retroreflectivity properties and durability to laundering. Thus, a retroreflective one-pack ink in accordance with the invention may retain a viscosity of between 10 and 30 pascal after storage for not less than 3 months, preferably not less than 6 months and more preferably not less than 12 months, and may also exhibit laundering durability such that retroreflectivity is not reduced by more than 40% (preferably by not more than 30% and more preferably by not more than 20%) when applied to a substrate in the form of a cotton, nylon or polyester and laundered for 5 cycles in accordance with ISO 6330, method 5A.

The coupling agent is usually one which is substantially unreactive at ambient temperature, namely 20° C. Typically the coupling agent is unreactive except at elevated temperature at which the printed substrate is cured, e.g. a temperature within the range of 60 to 200° C., e.g. 130 to 180° C.

The coupling agent may be rendered active by elevated temperature; however, we do not exclude the possibility that the coupling agent may be rendered active by other means such as exposure to UV light or other high energy radiation.

Typically the binder is polymeric and the coupling agent serves to couple the beads to the polymeric binder.

Viewed from another aspect, the invention resides in a one-pack or a two-pack retroreflective ink comprising microbeads in a liquid carrier medium including binder chemicals for attaching the microbeads to a substrate to which the ink is to be applied, the microbeads being incorporated in the carrier medium, and a coupling agent which couples the microbeads and cross-links the binder chemicals, characterised in that the coupling agent is not activated until the ink is printed.

The two-pack system comprises a separate pack for the coupling agent.

The ink may comprise retroreflective and/or non-retroflective microbeads. Typically the proportion of microbeads which do not have a retroreflective coating constitute no more than 50% by volume of the total microbead content but may be up to 100% when reflective flakes are used in conjunction with microbeads to provide retroreflectivity.

The binder and coupling agent may be selected from, but is not limited to, the following combinations:

polyvinylidene chloride copolymer as binder and (3-aminopropyl) silanetriol and/or blocked 1,6hexamethylene diisocyanate trimer as coupling agent;

an acrylic copolymer as binder and (3-aminopropyl)silanetriol and/or blocked 1,6hexamethylene diisocyanate trimer as coupling agent; and polyurethane as binder and blocked 1,6hexamethylene diisocyanate trimer as coupling agent.

The microbeads may have an aluminium coating, and may be pre-treated with a silicate before inclusion in the ink. They may for instance be pretreated with sodium silicate. They may be treated with a silane, especially a silane having a reactive group such as an amino group, which treatment may be after a silicate treatment and before inclusion in the ink. A suitable amino silane is bis-[gamma-(trimethoxysilyl)propyl]amine.

The ink may comprise pigment, and may, especially when comprising pigment, comprise non-retroreflective, which usually means un-metallised, microbeads. The pigment content is typically up to 5% by weight of the ink.

The microbeads may be pretreated before metallisation with stannous chloride.

The ink may be formulated—as to, e.g. viscosity, particle size—suitably for screen printing. The microbeads may have a median size in the range of 10 to 100 microns, e.g. 25 to 70 microns. Typically in the case of inks using metallised retroreflective microbeads, the median size is about 40 microns whereas in the case of inks using non-retroreflective microbeads in conduction with other reflective elements such as reflective flake particles, the microbeads typically have a median size of about 60 microns.

The microbeads, whether retroreflective or not, are preferably composed of high refractive index glass, such as a titanium/barium based glass with a refractive index in the range of 1.8 to 2.2, e.g. about 1.9.

The ink may comprise a humectant, which may comprise urea and/or 2,3propane diol, and may be water-based. It may comprise a buffer, to ensure an appropriate pH, such buffer, for example, comprising an ammonium phosphate buffer or a sodium phosphate buffer. A dispersant may also be included, as may a defoamer, a thickening agent, a cross-linking agent and a softening agent.

Other constituents that may be present in the ink may be selected from the group comprising carbon black; UV absorbing material; anti-scuffing agent, optionally a silicone or fluoropolymer; light spill-suppressing agent; anti-static agent and water repellant agent, optionally a silicone or fluoropolymer.

Non-water based inks may also be comprised within the invention. In this case, the need to protect the aluminium coating against attack in water-based media may be less important.

Surprisingly, having regard to the teaching of U.S. Pat. No. 5,650,213, substantially better quality inks—in terms of reflectivity, washfastness, abrasion resistance and shelf life—are produced with binder to bead volume ratios equal to or less than 50%. Essentially, more beads can be attached using less obscuring binder, more firmly and more permanently than when the prior art binder to bead ratios are used.

For a screen printing ink, the viscosity is desirably equal to or less than 40 pascals, preferably between 10 and 30 pascals, at room temperature.

The invention also comprises a method for making a one-pack retroreflective ink comprising the steps of:
  making microbeads;
  suspending the microbeads in a liquid carrier medium;
  the liquid carrier medium comprising binder chemicals for attaching the microbeads to a substrate to which the ink is to be applied and a coupling agent which couples the microbeads and cross-links the binder chemicals, the coupling agent being unreactive except at elevated temperature (e.g. within the range from 60 to 200° C. and usually from 130 to 180° C.) at which the printed substrate is cured.

The method may involve the application of an aluminium coating to glass microbeads. The microbeads may be pretreated with stannous chloride prior to application of the aluminium coating, and may be treated with a dilute solution of stannous chloride.

The microbeads may be hemispherically metallised in a vacuum metallising process in which they are held on a film with an adhesive coating for transport through the metallising process, the adhesive coating comprising a styrene/butadiene type or other adhesive, which loses its tack when wet. The film may comprise a polyester or polyolefin film. Following metallisation, the film may be passed through an aqueous solution of citric acid or other aqueous solution with a $pK_a$ value of around 2, and may be treated ultrasonically to assist in release of the microbeads from the adhesive surface. In contradistinction to other methods for attachment of beads for metallisation, this method is easier at least inasmuch as the citric acid bath can be re-used over and over without replenishment.

The microbeads may be treated prior to inclusion in the ink with a silicate, which may be a dilute aqueous solution of sodium silicate. The beads may also (with or without such sodium silicate treatment) be treated with a silane such as an amino silane prior to inclusion in the ink, and such silane treatment may follow the silicate treatment. A particularly beneficial amino silane is bis-[gamma-(trimethoxysilyl)propyl]amine. These treatments, severally and collectively, appear to enhance the permanence of the attachment of the aluminium coating to the microbeads and of the microbeads to the substrate on printing.

An aminoalkyl silanetriol and/or a blocked polyisocyanate may be added to the liquid carrier medium as coupling agent.

In the event, see below, that a two-pack, rather than a one-pack system is required, an alkoxysilyl alkyl derivative such as an amino silane—which could be the same amino silane used to treat the microbeads—and/or a polyisocyanate (typically where the microbeads are amine treated) may also be added to the liquid carrier medium as coupling agent, In the preparation of the ink, a liquid carrier medium may be prepared comprising binder chemicals and coupling agent, the microbeads being added to the medium. A pigment may be added to the medium containing the microbeads.

Further additive or additives to be incorporated in the liquid carrier medium, may be selected from the group comprising:
  pigment; humectant, optionally urea and/or 2,3 propane diol; buffer, optionally based on ammonium or sodium phosphates; dispersant; defoamer; thickening agent; cross-linking agent; softening agent; carbon black; UV absorbing material; anti-scuffing agent, optionally a silicone or fluoropolymer; light spill-suppressing agent; anti-static agent and water repellant agent, optionally a silicone or fluoropolymer.

Where a thickener is included, it may be added to the medium in two steps, namely before and after the addition of the binder and coupler.

According to a further aspect of the invention there is provided microbeads for use in the production of a retroreflective ink, the microbeads having silicate (optionally sodium silicate) and/or silane (optionally an amino silane such as bis-[gamma-(trimethoxysilyl)propyl]amino) and/or stannous chloride applied thereto.

The microbeads may be metallised, optionally with a coating of aluminium, the metal being superposed on the stannous chloride.

The microbeads may be metallised, optionally with a coating of aluminium, the silicate and/or silane being superposed on the metallised beads and the silane where present being superposed on the silicate where present.

Also within the scope of the invention is an ink incorporating such microbeads and substrates such as fabrics coated or printed with inks in accordance with the various aspects of the invention.

For certain applications, notably where printed or coated with retroreflective inks, for example for backdrops and special effects screens in film and television studios, it is desirable that fabrics used are fireproof, or fire retardant.

The specialised nature of some retroreflective inks, however, raises problems in connection with many normally fireproof or fire retardant fabric materials.

Another aspect of the invention is concerned with a fireproof or fire retardant fabric printed or coated with retroreflective ink that is particularly satisfactory as a backdrop or screen in the applications in question.

The invention comprises a fireproof or fire retardant fabric printed or coated with a retroreflective ink which comprises retroreflective elements in a polymeric matrix, the fabric comprising a structural component that chars before it melts.

The fabric may be made fireproof or fire retardant by application of a fire retardant agent, such as the commercially available Proban® or Pyrovatex®, to cellulosics, or it may be naturally fireproof or fire retardant, such as an aramid.

The ink is desirably non-burning, at least once applied to the fabric. The polymeric matrix may comprise polyvinylidene chloride (e.g. in the case of an aqueous-based ink), or polyvinyl chloride or other non-flammable plastisol.

Examples of suitable inks for this purpose are given hereinafter in Tables 2 and 3.

Substrates coated with inks in accordance with various aspects of the present invention may find use in a variety of applications such as flexible tape having a retroreflective coating, for instance tape as used in defining boundary lines and/or cordonning off areas such as crime scenes, construction sites, road works and other hazards.

Another important application is retroreflective materials materials for use as studio background material for chromakeying and like purposes, as disclosed in GB-A-2312565 and GB-A-2321814 the disclosures of which are incorporated herein by this reference. Thus, a substrate in the form of a flexible sheet material may be coated or printed with an ink in accordance with the present invention to produce a studio background material exhibiting a normalised retroreflectivity of at least about ¼ at an angle of incidence of at least 60 degrees to the normal, i.e. as described in GB-A-2312565 and GB-A-2321814.

A substrate provided with a retroreflective coating in accordance with the present invention may be provided with an additional coating or coatings for protecting the retroreflective coating against scuffing and/or moisture (i.e. a water repellant coating), e.g. a fluoropolymer coating applied over the retroreflective coating. An anti-static coating may also be applied to the substrate. Alternatively, instead of coating the substrate with such coatings after printing or coating the substrate with retroflecive ink, the ink may incorporate ingredients which will confer anti-scuffing, water repellant and/or anti-static properties.

The substrate may be selected from a wide range of materials including textile fabrics (e.g. woven or knitted) such as cotton, polyesters, nylons, silk, wool, viscose and acrylics.

Inks and methods for making them, according to the invention, will now be described with reference to the accompanying drawings, in which.

Examples of ink formulations according to the invention are given in Tables 1 to 4.

TABLE 1

Inks based on a acrylic copolymer binder system and (3-aminopropyl) silanetriol coupling agent

| Ingredient/Ink reference | C202 | C205 | C208 |
|---|---|---|---|
| Urea (Humectant) | 10 | 10 | 10 |
| Water | 154 | 179 | 179 |
| Ammonium phosphate buffer | 20 | 20 | 20 |
| Alcoprint PDN (Dispersant) | 2 | 2 | 2 |
| Agitan 218 (Defoamer) | 2 | 2 | 2 |

TABLE 1-continued

Inks based on a acrylic copolymer binder system and (3-aminopropyl) silanetriol coupling agent

| Ingredient/Ink reference | C202 | C205 | C208 |
|---|---|---|---|
| Alcoprint PT21 (Thickening agent) | 8 | 8 | 8 |
| 2,3 Propane diol (Humectant) | 25 | 25 | 25 |
| Alcoprint PFL (Trimethoxymethyl melamine cross-linking agent) | 15 | 15 | 15 |
| Alcoprint PSM (Softening agent) | 30 | 30 | 30 |
| Alcoprint PBA (Acrylic copolymer binder) | 300 | 225 | 225 |
| Ammonium hydroxide | 1 | 1 | 1 |
| Silquest VS-142 (3-aminopropyl silanetriol coupling agent) [20% in water] | 25 | 25 | 25 |
| Alcoprint PT21 (Thickening agent) | 6 | 3 | 4.6 |
| Metallised beads (40 micron) treated with sodium silicate and Silquest A-1170 (Bis[trimethoxy-silylpropyl]amine) | 400 | 450 | 400 |
| Nonmetallised beads (40 micron) treated with sodium silicate and Silquest A-1170 | — | — | 50 |
| Total | 997 | 995 | 996.6 |
| Binder volume % | 12 | 9 | 9 |
| Bead volume % | 16 | 18 | 18 |
| Binder volume/bead volume % | 75 | 50 | 50 |
| Viscosity | 20.7 | 16.2 | 23.2 |
| Temperature | 16.6 | 16.6 | 16.6 |
| pH | 8.4 | 8.9 | 8.8 |

TABLE 2

Inks based on a polyvinylidene chloride copolymer binder system and (3-aminopropyl) silanetriol coupling agent

| Ingredient/Ink reference | V246 | V248 | V251 |
|---|---|---|---|
| Urea (Humectant) | 10 | 10 | 10 |
| Water | 128 | 288 | 288 |
| Ammonium phosphate buffer | 20 | 20 | 20 |
| Emulsifier WN (Dispersant) | 3 | 3 | 3 |
| Agitan 218 (Defoamer) | 2 | 2 | 2 |
| Alcoprint PT21 (Thickening agent) | 8 | 8 | 8 |
| 2,3 Propane diol (Humectant) | 25 | 25 | 25 |
| Polidene 33-048 (Binder) | 273 | 163 | 163 |
| Ammonium hydroxide | 1.4 | 1.4 | 1.4 |
| Silquest VS-142 (Coupling agent) [20% in water] | 25 | 25 | 25 |
| Alcoprint PT21 (Thickening agent) | 3 | 5 | 3 |
| Metallised beads (40 micron) treated with sodium silicate and Silquest A-1170 | 500 | 450 | 400 |
| Non-metallised beads (40 micron) treated with sodium silicate and Silquest A-1170 | — | — | 50 |
| Total Weight of Ink (g) | 998.4 | 1,000.4 | 998.4 |
| Binder volume % | 15 | 9 | 9 |
| Bead volume % | 20 | 18 | 18 |
| Binder volume/bead colume % | 75 | 50 | 50 |
| Viscosity (pascals) | 25.6 | 14.2 | 12.3 |
| Temperature (° C.) | 17.7 | 17.6 | 17.2 |
| pH | 8.6 | 8.7 | 8.7 |

TABLE 3

Inks based on a polyvinylidene copolymer binder system and a combination of (3-aminopropyl) silanetriol and blocked hexamethylene diisocyanate trimer coupling agents

| Ingredient/Ink reference | V253 | V254 | V257 |
|---|---|---|---|
| Urea (Humectant) | 10 | 10 | 10 |
| Water | 91 | 183 | 183 |
| Ammonium phosphate buffer | 20 | 20 | 20 |
| Emulsifier WN (Dispersant) | 2 | 2 | 2 |
| Emulsifier HVN (Dispersant) | 2 | 2 | 2 |
| Agitan 218 (Defoamer) | 2 | 2 | 2 |

TABLE 3-continued

Inks based on a polyvinylidene copolymer binder system and a combination of (3-aminopropyl) silanetriol and blocked hexamethylene diisocyanate trimer coupling agents

| Ingredient/Ink reference | V253 | V254 | V257 |
|---|---|---|---|
| Alcoprint PT21 (Thickening agent) | 9.3 | 8 | 8 |
| 2,3 Propane diol (Humectant) | 25 | 25 | 25 |
| Polidene 33-048 (Binder) | 273 | 181 | 181 |
| Ammonium hydroxide | 1.4 | 1.4 | 1.4 |
| Silquest VS-142 (Coupling agent) [20% in water] | 25 | 25 | 25 |
| Trixene BI 7986 (Coupling agent) | 40 | 40 | 40 |
| Alcoprint PT21 (Thickening agent) | — | — | — |
| Metallised beads (40 micron) treated with sodium silicate and Silquest A-1170 | 500 | 500 | 400 |
| Non-metallised beads treated with sodium silicate and Silquest A-1170 | — | — | 100 |
| Total Weight of Ink (g) | 1,000.7 | 999.4 | 999.4 |
| Binder Volume % | 15 | 10 | 10 |
| Bead Columes % | 20 | 20 | 20 |
| Binder Volume/Bead Volume Ratio % | 75 | 50 | 50 |
| Viscosity (pascals) | 22.5 | 22.1 | 21.2 |
| Temperature (° C.) | 19.3 | 19.0 | 19.0 |
| pH | 8.4 | 8.3 | 8.4 |

TABLE 4

Inks based on a polyurethane binder system and a blocked 1,6 Hexamethylene diisocyanate trimer coupling agent

| Ingredient/Ink reference | P96 | P98 | P102 |
|---|---|---|---|
| Urea (Humectant) | 10 | 10 | 10 |
| Water | 62 | 187 | 187 |
| Sodium Phosphate Buffer | 10 | 10 | 10 |
| Emulsifier WN (Dispersant) | 3 | 3 | 3 |
| Agitan 218 (Defoamer) | 2 | 2 | 2 |
| Alcoprint PT21 (Thickener) | 3.0 | 3.1 | 3.0 |
| 2,3 Propane diol (Humectant) | 25 | 25 | 25.1 |
| Alcoprint PSM (Softener) | 30 | 30 | 30 |
| Witcobond 769 (Binder) | 300 | 225 | 226 |
| Trixene BI-7986 (Coupler) | 50 | 50 | 50 |
| Alcoprint PT21 (Thickener) | 0.7 | 4.0 | 3.0 |
| Metallised beads treated with sod. silicate and Silquest A-1170 | 500 | 450 | 400 |
| Non-metallised beads treated with sod. silicate and Silquest A-1170 | — | — | 70 |
| Total Weight of Ink (g) | 993.7 | 999.1 | 1,019.1 |
| Binder Volume % | 12 | 9 | 8.8 |
| Bead Volume % | 60 | 18 | 18.5 |
| Binder Volume/Bead Volume Ratio % | 60 | 50 | 47.9 |
| Viscosity (pascals) | O/R | 31.0 | 32.0 |
| Temperature (° C.) | 18.8 | 18.2 | 18.5 |

Generally speaking, the ingredients are added in the tabulated order given in Tables 1 to 4. The thickener is added in two stages. Pigment, not tabulated, is added at the end in suitable quantity to yield the desired colour.

Viscosities were measured with a Brookfield viscometer using a number 5 spindle rotating at 10 rpm.

Table 5 lists the chemical nature and sources of proprietary products used in the inks of Tables 1 to 4.

TABLE 5

| Ink Component | Proprietary Product | Chemical Nature | Supplier |
|---|---|---|---|
| Binder | Alcoprint PBA | Aqueous emulsion of an acrylic copolymer | Allied Colloids |
| | Polidene 33-048 | Aqueous emulsion of a vinylidene chloride/acrylate copolymer | Scott Bader |
| | Witcobond 769 | Water based polyurethane dispersion | Baxenden |
| Cross-linking/coupling agent | Alcoprint PFL | Trimethoxymethyl melamine | Allied Colloids |
| | Silquest VS-142 | 3-Aminopropyl silanetriol | OSi Specialities/Ambersil Ltd. |
| | Silquest A-1170 | bis-(trimethoxysilylpropyl)amine | OSi Specialities/Ambersil Ltd. |
| | Trixene BI-7986 | Blocked 1,6 hexamethylene diisocyanate trimer | Baxenden |
| Softening agent | Alcoprint PSM | | Allied Colloids |
| Thickening agent | Alcoprint PT21 | Dispersion of an acrylic copolymer in light mineral oil | Allied Colloids |
| Dispersant | Alcoprint PDN | Aqueous solution of an anionic acrylic polymer | Allied Colloids |
| | Emulsifier WN | Nonionic arylpolyglycol ether | Bayer |
| | Emulsifier HVN | | BASF |
| Defoaming agent | Agitan 218 | | Munzing Chemie |

Retroreflective microbeads are made, according to one aspect of the invention, by a process which is generally similar to the one that has been used commercially for many years, namely by embedding glass microspheres in an adhesive layer on a substrate and coating the exposed surface of the microspheres with an aluminium layer in a vacuum metalliser. There are, however, subtle, but important differences. The method according to the invention, which is novel and inventive per se for the manufacture of hemispherically coated microbeads, regardless of any ink formulation in which they will be used is illustrated by way of example in FIG. 1.

Figure 1:
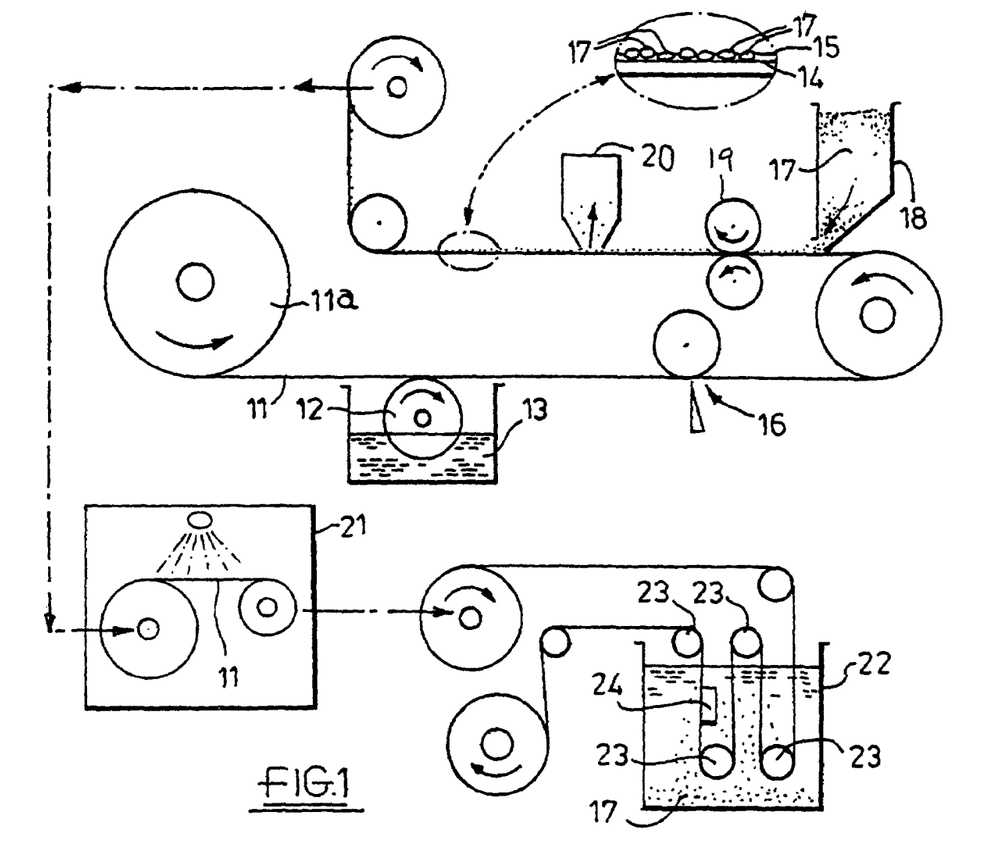
FIG. 1 is a diagrammatic illustration of the production of metallised beads.

A carrier material 11, which is for example a polyester film, supplied on a reel 11a, which may contain, say, 1000 m of film of width 1500 mm, is coated by contact with a lick roller 12 dipping into a bath 13 with an 18 micron layer 14 of a styrene/butadiene type adhesive 15, the coating thickness being determined e.g. by a doctor blade/roller arrangement 16.

Beads 17 (see inset to FIG. 1) are scattered on the adhesive layer 14 from a hopper 18 and pressed into the adhesive layer 14 by a roller arrangement 19. Excess beads are removed e.g. by suction arrangement 20.

Glass beads of refractive index 1.9, size 40 microns are used, and, after the roller arrangement 19, appear, in cross-section, as shown in the inset.

The beaded carrier material 11 is then passed through a vacuum metalliser 21 to be coated with aluminium to a thickness of about 0.3 microns. The material 11, wound on a reel, is placed in the vacuum metalliser and run off on to a take-up reel to which it is secured; then the metalliser is evacuated and the aluminium source energised and the material passed reel-to-reel to expose it to the aluminium vapour. The coated, beaded carrier 11 is then passed through a bath 22 of aqueous solution (1%) of citric acid at a temperature of 40–50° C., passing over a series of rollers 23 to provide a dwell time in the bath of several minutes. The material 11 also passes over an ultrasonic plate 24 which aids release of the microbeads which fall to the bottom of the bath 22. At the end of the run of 1000 m of carrier 11, the microbeads are sucked out of the bottom of the bath 22, rinsed with water and dried.

The effect of the citric acid bath is to cause the styrene/butadiene adhesive to lose its tack and release the microbeads. The material 11 regains its tack on drying, and can be re-used for further runs of bead manufacture without the need for further coating. The citric acid bath 22 can likewise be reused without replenishment of the citric acid.

Prior to coating, the glass beads are pre-treated with a dilute aqueous solution of stannous chloride, followed by drying and resieving. It is found that this gives significant improvement in the durability of the reflectivity of a printed design.

After coating, the beads are treated with a dilute aqueous solution of sodium silicate. It is thought that the treatment passivates the aluminium coating, reducing its susceptibility to attack in aqueous environments, while, at the same time, the sodium silicate reacts with the titanium/barium glass and/or the aluminium increasing the number of reactive sites on the surface of the coated microbeads that are available for reaction with the coupling agent in the ink.

If this sodium silicate treatment is carried out close to the metallisation process, the beads from that process can be used after rinsing but before drying. About 40 kg wet metallised beads (containing some 10 kg water) are mixed with a solution of 20 kg water containing 1.4 kg sodium silicate and stirred for 5 minutes. The beads are then allowed to settle, the sodium silicate solution decanted off, the beads rinsed with tap water, with a final rinse in deionised water.

Significant improvement in washfastness, especially with low (e.g. below 0.5%) levels of certain coupling agents in the formulation (which considerably improves shelf life), is obtained by further treatment of the metallised beads with amino silanes, significantly bis-[gamma-(trimethoxysilyl)propyl]amine.

The combined effect of these bead preparation treatments is to provide an ink with a shelf life well in excess of 12 months yet which exhibits insignificant loss of retroreflectivity after multiple washings at 40° C., even if the amount of coupling agent is as low as 0.5%.

Figure 2:
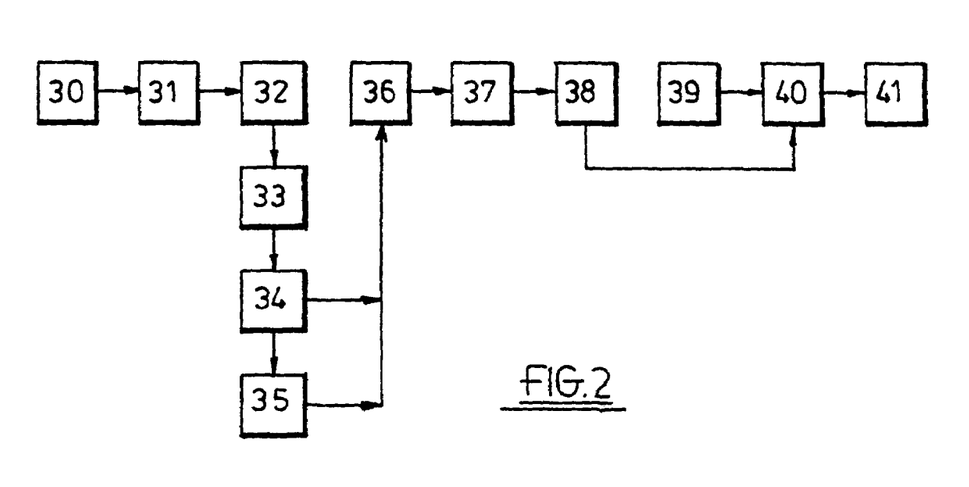
FIG. 2 is a block diagram of a process for making an ink.

FIG. 2 is a block diagram of production steps for a typical ink according to the invention, the steps being:

30  Glass microbead production, with any necessary sieving to a desired size range - about 40 microns is an ideal size;
31  Stannous chloride pre-treatment, drying;
32  Metallising;
33  Recovery in citric acid solution;
34  Rinsing;
35  Drying;
36  Sodium silicate treatment of metallised beads;
37  Rinsing;
38  Amino silane pre-treatment;
39  Mixing liquid carrier medium;
40  Add treated metallised (and, if desired, umetallised) beads to carrier medium;
41  Add pigment;

Ink formulations detailed herein, formulated by the methods described, operating as one-pack systems, have long shelf lives, being usable after more than six months, in many cases after more than a year after formulation (based on accelerated ageing measurements at elevated storage temperatures). They show higher initial retroreflectivities at the lower binder/bead volume ratios made possible by the various measures described.

Washfastness and abrasion resistance are acceptable with binder volumes as low as 9%—reducing binder content in the formulation containing polyvinylidene chloride and Trixene actually increases abrasion resistance.

The various novel ingredients and combinations of ingredients each have their contributions to make in connection with the production of one pack inks and while the importance of a binder combined with a coupling agent reacting only at elevated temperature has been particularly noted, it is not intended to suggest that that might be the only novel and inventive subject matter disclosed herein. The pre-treatment of the beads both before and after metallisation also has profound effects even with the binder/coupler systems and is of advantage also in the preparation of inks for printing on substrates which will not withstand elevated temperatures. Here it is necessary to resort to a two-pack system, with the coupling agent mixed into the ink just before printing. A reactive polyisocyanate may be used as a coupling agent in such circumstances. A two-pack arrangement is, of course, more convenient to use than the old three-pack system, and is made possible by bead pre-treatment.

Where unmetallised beads are added—giving the effect, quite obviously, of reducing overall retroreflectivity, but reducing the greyness associated with metallised beads and therefore enhancing the colour brightness of pigmented inks, the unmetallised beads also benefit from the bead pre-treatment, particularly treatment with silicate and silane.

Unmetallised beads may also be used in similar formulation, and having had similar pre-treatment, without metallised beads but with flake particles having a mirror-like finish. Such a coating composition, said to be suitable for application by brushing, was described in U.S. Pat. No. 3,835,087, Searight et al, issued 10 Sep. 1974, and printing ink of this description is commercially available.

According to the present invention, in another aspect, one-pack inks containing unmetallised glass microspheres and flake particles comprise a liquid carrier medium including binder chemicals for attaching the microbeads and flake particles to a substrate to which the ink is to be applied and a coupling agent which couples the microbeads and cross-links the binder chemicals, characterised in that the coupling agent is unreactive except at elevated temperature at which the ink of the substrate is cured.

Binder and coupler systems as described above are suitable, and the microbeads benefit in the same way from the sodium silicate and amino silane pre-treatment—the stannous chloride pre-treatment is unnecessary.

A preferred flake material is Iriodin 123-mica flake coated with titanium dioxide, supplied by Merck. The optimum particle size is 5–35 microns, and the flake may be present in an amount about 7.5% by weight.

Mean glass microbead size may be 60 micron—larger beads, e.g. up to 70 micron and larger may be used but may not be suitable for finer screen printing mesh sizes. Good quality, e.g. 1.9 refractive index, beads give better results than lower refractive index beads, and best results are obtained using 60 micron TSTF (twice sieved twice fired) beads.

Coloured reflectivity can be achieved by using interference pigments (Iriodin 200 series), while gold lustre mica pigments (Iriodin 300 series) and metal lustre pigments (Iriodin 500 series) give interesting effects particularly when printed on coloured fabrics.

Table 6 lists ingredients for a range of such inks.

TABLE 6

| Ingredient/Ink reference | NMB155 | NMB188 | NMB185 | NMB191 |
|---|---|---|---|---|
| Urea (Humecant) | 10 | 10 | 10 | 10 |
| Water | 79 | 134 | 94 | 91 |
| Ammonium phosphate buffer | 20 | 20 | 20 | — |
| Sodium phosphate buffer | — | — | — | 10 |
| Emulsifier WN (Dispersant) | — | 3 | 2 | 3 |
| Emulsifier HVN (Dispersant) | — | — | 2 | — |
| Alcoprint PDN (Dispersant) | 2 | — | — | — |
| Agitan 218 (Defoamer) | 2 | 2 | 2 | 2 |
| Alcoprint PSM (Softener) | 30 | — | — | 30 |
| Alcopriny PT21 (Thickener) | 4 | 4.8 | 3.3 | 3 |
| 2,3 Propane diol (Humectant) | 25 | 25 | 25 | 25 |
| Alcoprint PFL (Cross-linker) | 15 | — | — | — |
| Alcoprint PBA (Binder) [acrylic] | 300 | — | — | — |
| Polidene 33-048 (Binder) [polyvinylidene chloride] | — | 300 | 300 | — |
| Witcobond 769 (Binder) [polyurethane] | — | — | — | 300 |
| Trixene BI-7986 (Coupling agent) | — | — | 40 | 50 |
| Ammonium hydroxide | 1 | 1.4 | 1.4 | — |
| Silquest VS-142 (Coupling agent) [20% in water] | 25 | 25 | 25 | — |
| Alcoprint PT21 (Thickener) | 3.5 | — | — | 1 |
| Iriodin 123 [Mica coated with titanium dioxide] | 75 | 75 | 75 | 75 |
| Beads (60 micron) treated with sod. sil. + A-1170 | 400 | 400 | 400 | 400 |
| Total weight (g) | 991.5 | 1000.2 | 999.7 | 1000.0 |
| Viscosity (pascals) | | 23.6 | | |
| pH | | 8.5 | | |

The invention claimed is:

1. A combination of ingredients forming a retroreflective ink, the combination comprising metallised retroreflective elements, microbeads additional to said retroreflective elements and/or constituting said retroreflective elements at least in part, a binder chemical for attaching the retroreflective elements and microbeads to a substrate to which the ink is to be applied, the binder chemical being a polyvinylidene chloride co-polymer, a coupling agent for coupling the microbeads and cross-linking the binder chemical, the coupling agent being a mixture of an aminoalkyl silanetriol and a blocked hexamethylene diisocyanate trimer, and a buffer, the coupling agent being unreactive and uncured until a curing step is carried out and reactive when the curing step is carried out during which a temperature of the substrate and ink applied to the substrate is elevated to between 60 and 200° C., the coupling agent having a storage life of not less than about 3 months and being unreactive except at elevated temperature of the curing step.

2. The combination of claim 1 wherein at least some of the microbeads are without the retroreflective elements.

3. The combination of claim 1 further comprising one or more components selected from the group consisting of:
pigment, dispersant, defoamer, thickening agent, cross-linking agent, softening agent, carbon black, UV absorbing material, anti-scuffing agent, a silicone or fluoropolymer, light spill-suppressing agent, anti-static agent, water repellent agent, a silicone, and a fluoropolymer.

4. The combination of claim 1 wherein the volume ratio of the binder to the microbeads is equal to or less than 50%.

5. The combination of claim 1 wherein essentially all of the microbeads are unmetallised and the retroreflective elements include reflective flake particles.

6. The combination of claim 1 wherein the binder forms at least part of a liquid carrier medium for the retroreflective elements or microbeads.

7. The combination of claim 1 wherein the binder chemicals, retroreflective elements and microbeads are comprised of a one-pack retroreflective ink or a two-pack retroreflective ink having the coupling agent as the second pack.

8. The combination of claim 7 wherein the two-pack ink includes a reactive polyisocyanate or an alkoxysilyl alkyl derivative.

9. The combination of claim 1 wherein the microbeads are metallised with an aluminium coating that is superposed on a stannous chloride pre-treatment.

10. The combination of claim 9 wherein the metallised microbeads are treated with a solution of a silicate, followed by treatment with a silane.

11. The combination of claim 9 wherein the metallised microbeads are treated with an amino silane.

12. A composition that a is one-pack or a two-pack retroreflective ink which is comprised of the combination claimed in claim 1.

13. The composition of claim 12 wherein the retroreflective ink is water-based.

14. The composition of claim 13 that is suitably formulated for screen printing.

15. The composition of claim 12 wherein the ink has a viscosity that is less than or equal to about 40 Pascal seconds at room temperature.

16. A method for making a one-pack retroreflective ink comprising the steps of:
(a) making metallised microbeads;
(b) suspending the microbeads in a liquid carrier medium, the liquid carrier medium is comprised of a binder chemical for attaching the microbeads to a substrate to which the ink is to be applied, the binder chemical being a polyvinylidene chloride co-polymer, a coupling agent which couples the microbeads and cross-links the binder chemical, the coupling agent being an aminoalkyl silanetriol and a blocked hexamethylene diisocyanate trimer, and a buffer, the one-pack retroreflective ink having a storage life of not less than about 3 months and the coupling agent being unreactive and uncured until a curing step is carried out and reactive when the curing step is carried out during which a temperature of the substrate and ink applied to the substrate is elevated to between 60 and 200° C., the coupling agent having a storage life of not less than about 3 months and being unreactive except at elevated temperature of the curing step.

17. The method of claim 16 wherein step (a) includes applying an aluminium coating to the microbeads.

18. The method of claim 17 wherein step (a) includes pre-treating the microbeads with stannous chloride prior to application of the aluminium coating.

19. The method of claim 18 wherein step (a) includes treating the microbeads with a dilute aqueous solution of stannous chloride.

20. The method of claim 16 wherein step (a) includes hemispherically metallising the microbeads in a vacuum metallising process in which the microbeads are held on a film with an adhesive coating for transport through the metallising process, the adhesive coating is comprised of styrene-butadiene adhesive.

21. The method according to claim 20, wherein step (a) includes passing the film through an aqueous solution of citric acid after metallisation.

22. The method of claim 20 wherein step (a) includes ultrasonically treating the film to assist in release of the microbeads from the adhesive.

23. The method of claim 19 wherein step (a) includes treating the microbeads prior to inclusion in the ink with a silicate.

24. The method of claim 16 wherein step (a) includes treating the microbeads with a silane or an amino silane prior to inclusion in the ink.

25. The method of claim 23 wherein step (a) includes treating the microbeads with an amino silane after the silicate treatment.

26. The method of claim 16 wherein step (b) includes preparing the liquid carrier medium from the binder chemicals and the coupling agent before suspending the microbeads in the liquid carrier medium.

27. The method of claim 26 wherein the liquid carrier medium of step (b) includes additives selected from the group consisting of:
pigment, dispersant, defoamer, thickening agent, cross-linking agent, softening agent, carbon black, UV absorbing material, anti-scuffing agent, silicone, fluoropolymer, light spill-suppressing agent, anti-static agent and water repellent agent.

28. The method of claim 27 wherein step (b) includes adding a thickener to the liquid carrier medium before or after the addition of the binder chemicals and coupling agent.

29. A composition of an ink produced by the method of claim 16.

30. A composition of a substrate coated or printed with a composition of claim 29.

31. The composition of claim 30 wherein the substrate is a screen for displaying projected images or a studio background for chroma-keying applications.

32. The composition of claim 30 wherein the substrate is a flexible tape.

33. The method of providing a substrate having a retroreflective coating, comprising the steps of:
applying to the substrate an ink as claimed in claim 29 wherein the ink is formulated as a one-pack retroreflective ink and the coupling agent is activated after the ink is printed or coated on to the substrate.

34. The method of claim 33 wherein the coupling agent is activated by curing the ink coating at elevated temperature.

35. The composition of claim 29 wherein the ink is a retroreflective one-pack ink having a storage life of not less than about 3 months.

36. The composition of claim 35 wherein the retroreflective one-pack ink has a viscosity of between about 10 and 30 Pascal seconds after storage of not less than about 3 months.

37. The composition of claim 35 wherein the retroreflective one-pack ink applied to the substrate and cured has a laundering durability such that the retroreflectivity is not reduced by more than about 40% when the substrate is in the form of a cotton, nylon or polyester fabric and laundered for 5 cycles in accordance with ISO 6330, method 5A.

38. The composition of claim 1, wherein the coupling agent has a storage life of not less than about 3 months and is unreactive except at elevated temperature of between 130 and 180° C. at which the one-pack retroreflective ink printed on the substrate is cured.

39. The method of claim 16, wherein the coupling agent has a storage life of not less than about 3 months and is unreactive except at elevated temperature of between 130 and 180° C. at which the one-pack retroreflective ink printed on the substrate is cured.

40. The combination of claim 10 wherein the microbeads have at least one of the following characteristics selected from the group consisting of: a refractive index in the range of about 1.8 to 2.2, a median size of the microbeads in the range of about 10 to 100 microns and the microbeads are composed of titanium glass or barium glass.

41. The method of claim 25 wherein the microbeads have at least one of the following characteristics selected from the group consisting of: a refractive index in the range of about 1.8 to 2.2, a median size of the microbeads in the range of about 10 to 100 microns and the microbeads are composed of titanium glass or barium glass.

42. A combination of ingredients forming a retroreflective ink, the combination comprising retroreflective elements, microbeads additional to said retroreflective elements and/or constituting said retroreflective elements at least in part, a binder chemical for attaching the retroreflective elements and microbeads to a substrate to which the ink is to be applied, the binder chemical being a polyvinylidene chloride co-polymer, and a coupling agent for coupling the microbeads and cross-linking the binder chemical, the coupling agent being a mixture of an aminoalkyl silanetriol and a blocked hexamethylene diisocyanate trimer and being unreactive and uncured until a curing step is carried out and reactive when the curing step is carried out during which a temperature of the substrate and ink applied to the substrate is elevated to between 60 and 200° C., the coupling agent having a storage life of not less than about 3 months and being unreactive except at elevated temperature of the curing step, wherein the ink retains a viscosity of between 10 and 30 Pascal seconds for not less than 3 months.

43. A method for making a one-pack retroreflective ink comprising the steps of:
(a) making metallised microbeads;
(b) suspending the microbeads in a liquid carrier medium, the liquid carrier medium is comprised of a binder chemical for attaching the microbeads to a substrate to which the ink is to be applied, the binder chemical being a polyvinylidene chloride co-polymer, and a coupling agent which couples the microbeads and cross-links the binder chemical, the coupling agent being a mixture of an aminoalkyl silanetriol and a blocked hexamethylene diisocyanate trimer, the one-pack retroreflective ink having a storage life of not less than about 3 months and the coupling agent being unreactive and uncured until a curing step is carried out and reactive when the curing step is carried out during which a temperature of the substrate and ink applied to the substrate is elevated to between 60 and 200° C., the coupling agent having a storage life of not less than about 3 months and being unreactive except at elevated temperature of the curing step,
wherein the ink retains a viscosity of between 10 and 30 Pascal seconds for not less than 3 months.

44. The combination of ingredients according to claim 1 wherein the buffer is a phosphate buffer.

45. The combination of ingredients according to claim 44 wherein the phosphate buffer is an ammonium phosphate buffer.

46. The combination of ingredients according to claim 44 wherein the phosphate buffer is a sodium phosphate buffer.

47. The combination of ingredients according to claim 1 additionally including a humectant.

48. The combination of ingredients according to claim 47 wherein the humectant is urea.

49. The combination of ingredients according to claim 47 wherein the humectant is a combination of urea and 2,3propane diol.

50. The combination of claim 1 wherein the combination comprises a one pack retroreflective ink.

51. The composition of claim 12 wherein the ink has a viscosity of between 10 and 30 Pascal seconds at room temperature.

52. The method of claim 16 wherein the liquid carrier medium of step (b) includes a phosphate buffer.

53. The method of claim 52 wherein the phosphate buffer is an ammonium phosphate buffer.

54. The method of claim 52 wherein the phosphate buffer is a sodium phosphate buffer.

55. The method of claim 16 wherein the liquid carrier medium of step (b) additionally includes a humectant.

56. The method of claim 55 wherein the humectant is urea.

57. The method of claim 55 wherein the humectant is a combination of urea and 2,3propane diol.

* * * * *